United States Patent
Rozman et al.

(10) Patent No.: US 11,043,880 B2
(45) Date of Patent: Jun. 22, 2021

(54) ELECTRIC POWER GENERATING SYSTEM WITH A SYNCHRONOUS GENERATOR

(71) Applicant: Hamilton Sundstrand Corporation, Charlotte, NC (US)

(72) Inventors: Gregory I. Rozman, Rockford, IL (US); Steven J. Moss, Rockford, IL (US); Jacek F. Gieras, Glastonbury, CT (US)

(73) Assignee: Hamilton Sunstrand Corporation, Charlotte, NC (US)

( * ) Notice: Subject to any disclaimer, the term of this patent is extended or adjusted under 35 U.S.C. 154(b) by 815 days.

(21) Appl. No.: 15/348,335

(22) Filed: Nov. 10, 2016

(65) Prior Publication Data

US 2018/0131254 A1    May 10, 2018

(51) Int. Cl.
| | | |
|---|---|---|
| H02K 11/049 | (2016.01) | |
| H02P 25/22 | (2006.01) | |
| H02P 9/02 | (2006.01) | |
| H02P 9/48 | (2006.01) | |
| H02K 3/28 | (2006.01) | |
| H02P 101/45 | (2016.01) | |

(52) U.S. Cl.
CPC ............ *H02K 11/049* (2016.01); *H02K 3/28* (2013.01); *H02P 9/02* (2013.01); *H02P 9/48* (2013.01); *H02P 25/22* (2013.01); *H02P 2101/45* (2015.01)

(58) Field of Classification Search
CPC ........ H02K 11/049; H02K 3/28; H02K 11/00; H02K 3/12; H02K 11/0094; H02K 11/33
See application file for complete search history.

(56) References Cited

U.S. PATENT DOCUMENTS

| 3,896,349 | A | | 7/1975 | Lozenko | |
|---|---|---|---|---|---|
| 4,158,881 | A | * | 6/1979 | Simmons | ............ H02M 3/3376 363/25 |
| 4,649,337 | A | | 3/1987 | Stucker | |
| 4,780,659 | A | | 10/1988 | Bansal | |
| 5,198,698 | A | | 3/1993 | Paul | |

(Continued)

FOREIGN PATENT DOCUMENTS

| CN | 202395465 | 8/2012 |
|---|---|---|
| CN | 203056806 | 7/2013 |

(Continued)

OTHER PUBLICATIONS

USPTO, Non-Final Office Action dated Dec. 14, 2018 in U.S. Appl. No. 15/236,890.

(Continued)

*Primary Examiner* — Tran N Nguyen
*Assistant Examiner* — Leda T Pham
(74) *Attorney, Agent, or Firm* — Snell & Wilmer L.L.P.

(57) ABSTRACT

A synchronous generator may comprise a rotor and a stator. The stator may comprise a first armature winding configured to output a first three-phase voltage and a second armature winding configured to output a second three-phase voltage. The synchronous generator may further comprise a first rectifier configured to rectify the first three-phase voltage received from the first armature winding, and a second rectifier configured to rectify the second three-phase voltage received from the second armature winding.

19 Claims, 3 Drawing Sheets

(56) References Cited

U.S. PATENT DOCUMENTS

| | | | |
|---|---|---|---|
| 5,311,419 A | 5/1994 | Shires | |
| 5,318,142 A | 6/1994 | Bates | |
| 5,430,362 A | 7/1995 | Carr | |
| 5,536,987 A | 7/1996 | Hayashi | |
| 5,642,021 A | 6/1997 | Liang | |
| 5,917,295 A | 6/1999 | Mongeau | |
| 6,058,031 A | 5/2000 | Lyons | |
| 6,101,102 A | 8/2000 | Brand | |
| 6,144,190 A | 11/2000 | Scott | |
| 6,229,243 B1 | 5/2001 | Roesel, Jr. | |
| 6,456,946 B1 | 9/2002 | O'Gorman | |
| 6,697,271 B2 | 2/2004 | Corzine | |
| 6,873,134 B2 | 3/2005 | Canter | |
| 6,965,183 B2 | 11/2005 | Dooley | |
| 7,057,376 B2 | 6/2006 | Cook et al. | |
| 7,521,814 B2 | 4/2009 | Nasr | |
| 7,593,243 B2 | 11/2009 | Ganev et al. | |
| 7,619,237 B2 | 11/2009 | Rozman et al. | |
| 7,672,147 B1 | 3/2010 | Schutten | |
| 7,746,024 B2 | 6/2010 | Rozman et al. | |
| 7,777,384 B2 | 8/2010 | Gieras | |
| 7,906,866 B2 | 3/2011 | Anghel et al. | |
| 8,085,003 B2 | 12/2011 | Gieras | |
| 8,093,857 B1 | 1/2012 | Kolomeitsev | |
| 8,115,446 B2 | 2/2012 | Piccard | |
| 8,148,834 B2* | 4/2012 | Huang | H02K 19/38 290/31 |
| 8,330,413 B2 | 12/2012 | Lazarovich | |
| 8,358,111 B2 | 1/2013 | Rozman et al. | |
| 8,513,911 B2 | 8/2013 | Jones et al. | |
| 8,738,268 B2 | 5/2014 | Karimi et al. | |
| 8,816,641 B2 | 8/2014 | Andrea et al. | |
| 8,829,723 B2 | 9/2014 | Gravoc et al. | |
| 8,896,252 B2 | 11/2014 | Yamada | |
| 8,982,593 B2 | 3/2015 | Nondahl et al. | |
| 9,059,647 B2 | 6/2015 | Rozman et al. | |
| 9,088,230 B2 | 7/2015 | Rozman et al. | |
| 9,118,206 B2 | 8/2015 | Peterson et al. | |
| 9,193,273 B1 | 11/2015 | Frank et al. | |
| 9,209,741 B2 | 12/2015 | Gao et al. | |
| 9,287,745 B2 | 3/2016 | Akatsu | |
| 9,325,229 B2 | 4/2016 | Rozman et al. | |
| 9,731,609 B2 | 8/2017 | Ambrosio | |
| 9,868,409 B2 | 1/2018 | Cook | |
| 9,985,562 B1 | 5/2018 | Rozman | |
| 2001/0054882 A1* | 12/2001 | Nakamura | H02J 7/1492 322/28 |
| 2002/0053851 A1 | 5/2002 | Kreuzer | |
| 2002/0190695 A1 | 12/2002 | Wall | |
| 2006/0006655 A1* | 1/2006 | Kanazawa | H02P 25/22 290/40 B |
| 2006/0087869 A1 | 4/2006 | Weger | |
| 2008/0019062 A1 | 1/2008 | Dooley | |
| 2008/0103632 A1 | 5/2008 | Saban et al. | |
| 2008/0164851 A1 | 7/2008 | Ganev | |
| 2009/0009019 A1 | 1/2009 | Lihu et al. | |
| 2009/0085531 A1 | 4/2009 | Ooiwa | |
| 2009/0146595 A1 | 6/2009 | Immler | |
| 2010/0133816 A1 | 6/2010 | Abolhassani et al. | |
| 2010/0244599 A1 | 9/2010 | Saban | |
| 2010/0276993 A1 | 11/2010 | King | |
| 2011/0121769 A1 | 5/2011 | Rozman | |
| 2011/0141773 A1 | 6/2011 | Larsen | |
| 2011/0176340 A1 | 7/2011 | Sakakibara | |
| 2012/0098261 A1 | 4/2012 | Rozman | |
| 2012/0119711 A1 | 5/2012 | Rozman | |
| 2012/0126758 A1 | 5/2012 | Fang | |
| 2013/0049648 A1 | 2/2013 | Rozman | |
| 2013/0320943 A1 | 12/2013 | Meehan | |
| 2014/0197639 A1 | 7/2014 | Bala | |
| 2014/0208579 A1 | 7/2014 | Wang | |
| 2014/0226382 A1 | 8/2014 | Saito | |
| 2014/0265994 A1* | 9/2014 | Mao | H02P 25/18 318/773 |
| 2014/0346897 A1 | 11/2014 | Wangemann | |
| 2014/0347898 A1 | 11/2014 | Raju et al. | |
| 2014/0369092 A1 | 12/2014 | Nguyen | |
| 2015/0016159 A1 | 1/2015 | Deboy | |
| 2015/0061606 A1 | 3/2015 | Pan | |
| 2015/0061607 A1 | 3/2015 | Pan | |
| 2015/0180252 A1 | 6/2015 | Stempin | |
| 2015/0236634 A1* | 8/2015 | Han | H02P 5/74 318/504 |
| 2015/0298627 A1 | 10/2015 | Nordlander | |
| 2015/0311719 A1* | 10/2015 | Andresen | H02J 3/36 307/82 |
| 2015/0349598 A1 | 12/2015 | Gieras et al. | |
| 2016/0294238 A1* | 10/2016 | Gehrke | H02K 21/04 |
| 2018/0109193 A1 | 4/2018 | Hirota | |

FOREIGN PATENT DOCUMENTS

| | | |
|---|---|---|
| CN | 104158212 | 1/2015 |
| CN | 104269875 | 1/2015 |
| CN | 105656269 | 6/2016 |
| DE | 3408394 | 9/1985 |
| EP | 0881752 | 12/1998 |
| EP | 2114001 | 11/2009 |
| EP | 2259422 | 12/2010 |
| EP | 2341608 | 7/2011 |
| EP | 2579437 | 4/2013 |
| EP | 2725689 | 4/2014 |
| EP | 2815913 | 12/2014 |
| FR | 2920260 | 2/2009 |
| GB | 828734 | 2/1960 |
| GB | 2506719 | 4/2014 |
| JP | 2007209199 | 8/2007 |
| JP | 2015080283 | 4/2015 |
| WO | 2012016062 | 2/2012 |
| WO | 2014026840 | 2/2014 |
| WO | 2014157719 | 10/2014 |
| WO | 2016194790 | 12/2016 |

OTHER PUBLICATIONS

European Patent Office, European search Report dated Mar. 19, 2018 in Application No. 17200650.4-1202.

European Patent Office, European Search Report dated Mar. 14, 2018 in Application No. 17196186.5-1201.

European Patent Office, European Search Report dated May 4, 2018 in Application No. 18150104.0-1202.

Pre-Interview First Office Action dated Apr. 16, 2018 in U.S. Appl. No. 15/453,350.

USPTO, Non-Final Office Action dated Mar. 14, 2019 in U.S. Appl. No. 15/249,639.

USPTO, First Action Interview Office Action dated Mar. 22, 2019 in U.S. Appl. No. 15/348,313.

USPTO, Non-Final Office Action dated Apr. 5, 2019 in U.S. Appl. No. 15/397,354.

European Patent Office, European Search Report dated Mar. 19, 2018 in Application No. 17174627.4.

Khomfoi, Surin and Leon M. Tolbert, Chapter 31 Multilevel Power Converters, The University of Tennessee, pp. 31-1-31-50 (2007).

European Patent Office, European Search Report dated Apr. 22, 2016 in Application No. 15168153.3.

USPTO, Non-Final Office Action dated Mar. 9, 2018 in U.S. Appl. No. 15/236,890.

European Patent Office, European Search Report dated Jan. 16, 2018 in Application No. 17185067.0.

European Patent Office, European Search Report dated Jan. 22, 2018 in Application No. 17184013.5.

M. Popescu, D. G. Dorrell, L. Alberti, N. Bianchi, D.A. Stalton, and D. Hawkins, Thermal Analysis of Duplex Three-Phase Induction Motor Under Fault Operating Conditions, IEEE Trans. On Industry Applications, vol. 49, No. 4, Jul./Aug. 2013, pp. 1523-1.

USPTO, Notice of Allowance dated Feb. 15, 2018 in U.S. Appl. No. 15/207,901.

USPTO, Notice of Allowance dated Sep. 12, 2018 in U.S. Appl. No. 15/453,350.

(56) References Cited

OTHER PUBLICATIONS

USPTO, First Action Interview Office Action dated May 16, 2018 in U.S. Appl. No. 15/453,350.
USPTO, Notice of Allowance dated Apr. 11, 2018 in U.S. Appl. No. 15/453,383.
USPTO, Requirement Restriction/Election dated Oct. 11, 2018 in U.S. Appl. No. 15/348,313.
USPTO, Final Rejection Office Action dated Oct. 4, 2018 in U.S. Appl. No. 15/236,890.
European Patent Office, European Search Report dated Jul. 30, 2018 in Application No. 18160703.7-1202.
Balog R et al: "Automatic tuning of coupled inductor filters", Power Electronics Specialists Conference; [Annual Power Electronics Specialists Conference], vol. 2, Jun. 23, 2002(Jun. 23, 2002), pp. 591-596.
Nishida Yet al: "A new harmonic reducing three-phase diode rectifier for high voltage and high power applications", Industry Applications Conference, 1997. Thirty-Second IAS Annual Meeting, IAS 97., Conference Record of the 1997 IEEE New Orleans, LA, USA Oct. 5-9, 1997, New York, NY, USA IEEE, US, vol. 2, Oct. 5, 1997 (Oct. 5, 1997), pp. 1624-1632.
U.S. Appl. No. 15/207,901, filed Jul. 12, 2016 and entitled Integrated Modular Electric Power System for a Vehicle.
U.S. Appl. No. 15/236,890, filed Aug. 15, 2016 and entitled Active Rectifier Topology.
U.S. Appl. No. 15/249,639, filed Aug. 29, 2016 and entitled Power Generating Systems Having Synchronous Generator Multiplex Windings and Multilevel Inverters.
U.S. Appl. No. 15/348,313, filed Nov. 10, 2016 and entitled High Voltage Direct Current System for a Vehicle.
U.S. Appl. No. 15/397,354, filed Jan. 3, 2017 and entitled Electric Power Generating System With a Permanent Magnet Generator.
U.S. Appl. No. 15/453,350, filed Mar. 8, 2017 and entitled Electric Power Generating System With a Permanent Magnet Generator and Combination of Active and Passive Rectifiers.
U.S. Appl. No. 15/453,383, filed Mar. 8, 2017 and entitled Electric Power Generating System With a Synchronous Generator and a Tunable Filter.
Xu, et al., "Reliability analysis and redundancy configuration of MMC with hybrid submodule topologies," IEEE Trans. Power Electron, vol. 31, No. 4, pp. 2720-2729, Apr. 2016.
Gupta, et al., "Multilevel inverter topologies with reduced device count: a review," IEEEE Trans. Power Electron, vol. 31, No. 1, pp. 135-151, Jan. 2016.
Soong, et al.., "Assessment of Fault Tolerance in Modular Multilevel Converters with Integrated Energy Storage," IEEE Trans. Power Electron., vol. 31, No. 6, pp. 4085-4095, Jun. 2016.
European Patent Office, European Office Action dated Jun. 17, 2019 in Application No. 17185067.0.
USPTO, Final Office Action dated Jun. 27, 2019 in U.S. Appl. No. 15/236,890.
USPTO, Notice of Allowance dated Aug. 21, 2019 in U.S. Appl. No. 15/348,313.
USPTO, Pre-Interview First Office Action dated Feb. 8, 2019 in U.S. Appl. No. 15/348,313.
European Patent Office, European Office Action dated Nov. 26, 2020 in Application No. 17200650.4.

\* cited by examiner

ELECTRIC POWER GENERATING SYSTEM WITH A SYNCHRONOUS GENERATOR

FIELD

The disclosure generally relates to electrical power systems, and more particularly to the design of an electrical power generating system for a vehicle.

BACKGROUND

Ground vehicles, included those suitable for off road use, have migrated toward hybrid electric technology using high voltage direct current (HVDC) distribution. A synchronous generator may be used to generate electric power for an electronic power system. A synchronous generator typically includes a stator winding and a rotor winding to generate a single three-phase voltage. The three-phase voltage may be outputted to a filter for conversion to a DC voltage.

SUMMARY

In various embodiments, a synchronous generator is disclosed. A synchronous generator may comprise a rotor, a stator comprising a first armature winding configured to output a first three-phase voltage, and a second armature winding configured to output a second three-phase voltage, a first rectifier configured to rectify the first three-phase voltage received from the first armature winding, and a second rectifier configured to rectify the second three-phase voltage received from the second armature winding.

In various embodiments, the first rectifier may be configured to output a first direct current (DC) voltage and the second rectifier is configured to output a second DC voltage. The first rectifier may comprise a first six-pulse rectifier and the second rectifier comprises a second six-pulse rectifier. The rotor may comprise an exciter armature winding, a rotating rectifier, and a main field winding. A phase shift between the first three-phase voltage and the second three-phase voltage may comprise 360/n degrees, where n is the total number of armature winding sets in the stator. The stator may further comprise an exciter field winding. The exciter field winding may control an output voltage of the synchronous generator. The synchronous generator may comprise at least one of a permanent magnet generator (PMG) or a wound field synchronous generator. The first rectifier and the second rectifier may be housed within the synchronous generator.

In various embodiments, an electric power generating system is disclosed. An electric power generating system may comprise a synchronous generator comprising a rotor, a stator comprising a first armature winding configured to output a first three-phase voltage, and a second armature winding configured to output a second three-phase voltage, a first rectifier configured to rectify the first three-phase voltage received from the first armature winding, and a second rectifier configured to rectify the second three-phase voltage received from the second armature winding, a first rectifier filter connected across the first rectifier, and a second rectifier filter connected across the second rectifier, wherein the first rectifier filter and the second rectifier filter are connected in series.

In various embodiments, the first rectifier may be configured to output a first direct current (DC) voltage and the second rectifier is configured to output a second DC voltage. The electric power generating system may further comprise an output filter connected across the first rectifier filter and the second rectifier filter. The output filter may receive a DC output voltage comprising a sum of the first DC voltage and the second DC voltage. The first rectifier may comprise a first six-pulse rectifier and the second rectifier may comprise a second six-pulse rectifier. The rotor may comprise an exciter armature winding, a rotating rectifier, and a main field winding. The stator may further comprise an exciter field winding. The exciter field winding may control an output voltage of the synchronous generator. The electric power generating system may further comprise a voltage regulator in electronic communication with the output filter and in electronic communication with the exciter field winding, wherein the voltage regulator controls the main field winding via the exciter field winding. The synchronous generator may comprise at least one of a permanent magnet generator (PMG) or a wound field generator.

In various embodiments, a method for generating electric power is disclosed. A method for generating electric power may comprise rotating a rotor of a synchronous generator, generating, via a first stator armature winding, a first three-phase voltage in response to the rotating, generating, via a second stator armature winding, a second three-phase voltage in response to the rotating, rectifying, via a first rectifier, the first three-phase voltage into a first DC voltage, rectifying, via a second rectifier, the second three-phase voltage into a second DC voltage, outputting, by the synchronous generator, the first DC voltage, and outputting, by the synchronous generator, the second DC voltage.

In various embodiments, the method may further comprise filtering, by a first rectifier filter, the first DC voltage, filtering, by a second rectifier filter, the second DC voltage, wherein the first rectifier filter and the second rectifier filter are connected in series, and filtering, by an output filter, a DC output voltage comprising a sum of the first DC voltage and the second DC voltage.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
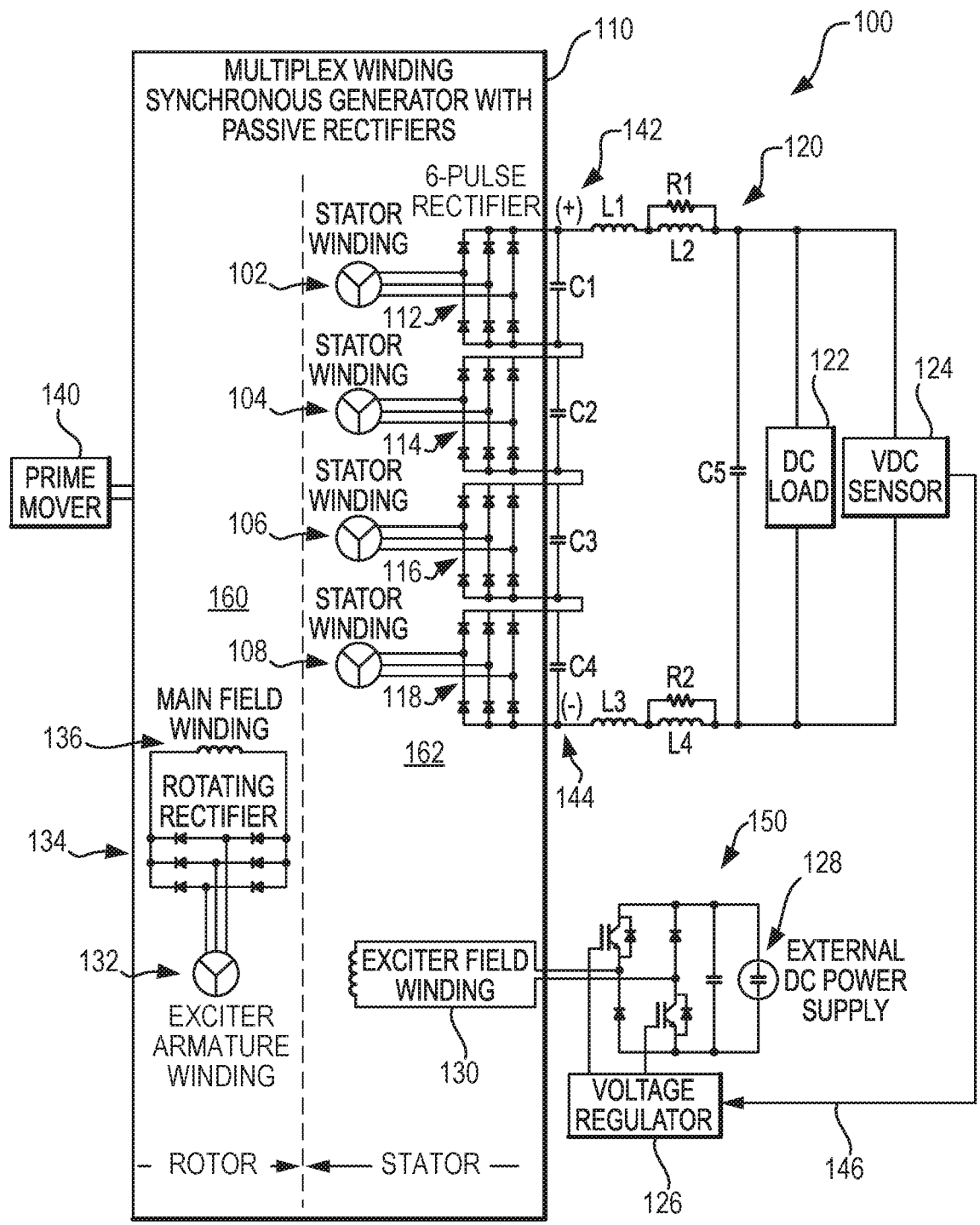
FIG. 1 illustrates a schematic view of an electric power generating system (EPGS), in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In that regard, use of the term "electronic communication" includes both "electrical communication" and "inductive communication."

In various embodiments, synchronous generators of the present disclosure make use of multiple stator armature windings disposed in a single stator. Rectifiers are housed within the synchronous generator for each respective stator armature winding. As a result, a plurality of outputs is connected in series to generate an HVDC signal. In this regard, synchronous generators of the present disclosure may result in improved packaging by reducing the size of diodes included in the rectifiers. Synchronous generators of the present disclosure have significant reduction in weight in filters, such as DC link capacitors. Synchronous generators of the present disclosure may generate a DC output voltage having reduced DC bus voltage ripple with low DC bus capacitance. Synchronous generators of the present disclosure may tend to minimize use of active power switches and associated control.

With reference to FIG. 1, a schematic view of an electric power generating system (EPGS) 100 is illustrated, in accordance with various embodiments. EPGS 100 may include a synchronous generator 110 and an output filter 120. Synchronous generator 110 may include a rotor 160 and a stator 162. Rotor 160 may be driven by a prime mover 140. In various embodiments, prime mover 140 may comprise an engine, such as a diesel engine for example. But, prime mover 140 may comprise any mover suitable for rotating rotor 160. Synchronous generator 110 may generate electric power in response to rotation of rotor 160. This electric power may pass through output filter 120. Output filter 120 may be in electronic communication with synchronous generator 110. In various embodiments, synchronous generator 110 may comprise a permanent magnet generator (PMG). In various embodiments, synchronous generator 110 may comprise a wound field synchronous generator.

In various embodiments, rotor 160 may comprise an exciter armature winding 132, a rotating rectifier 134, and a main field winding 136. Stator 162 may include a plurality of stator armature windings. These stator armature windings may include a first armature winding 102, a second armature winding 104, a third armature winding 106, and a fourth armature winding 108. In various embodiments, during normal operation of synchronous generator 110, a DC current (i.e., via external DC power supply 128) is applied to the rotor main field winding 136 to produce a rotor magnetic field. The rotor 160 is turned by an external device (e.g., prime mover 140) producing a rotating magnetic field, which induces a 3-phase voltage within each of the stator windings. First armature winding 102 may be configured to output a first three-phase voltage in response to the rotation of rotor 160. Second armature winding 104 may be configured to output a second three-phase voltage in response to the rotation of rotor 160. Similarly, third armature winding 106 and fourth armature winding 108 may each be configured to output their own respective three-phase voltage.

The number of three-phase armature winding sets (i.e., first armature winding 102, second armature winding 104, etc.) may include any number n of stator armature windings, such as two or more armature windings. The phase shift between armature windings should be 360/n. Thus, in the exemplary embodiment of FIG. 1, the phase shift between armature windings is 360/4, or 90. This phase shift may be achieved by distribution of windings in slots of the stator. This feature enables reduction of the voltage ripple at the DC bus (i.e., across positive terminal 142 and negative terminal 144) and reduction of the size of DC output filter 120 as well as rectifier filters C1, C2, C3, and C4.

A first rectifier 112 may rectify the first three-phase voltage. Stated another way, the first rectifier 112 may convert the first three-phase voltage from a three-phase voltage to a direct current (DC) voltage. A second rectifier 114 may rectify the second three-phase voltage. Similarly, a third rectifier 116 and a fourth rectifier 118 may each rectify the respective third three-phase voltage and the fourth three-phase voltage. First rectifier 112 may comprise a six-pulse rectifier. First rectifier 112 may comprise a plurality of diodes.

The first rectifier 112 may output the first rectified voltage, now a first DC voltage, where it may be received by electronic components located externally from the synchronous generator 110. In this regard, first rectifier 112, second rectifier 114, third rectifier 116, and fourth rectifier 118 may be housed within synchronous generator 110. A first rectifier filter C1 may be connected across first rectifier 112. A second rectifier filter C2 may be connected across second rectifier 114. Similarly, a third rectifier filter C3 and a fourth rectifier filter C4 may be connected across third rectifier 116 and fourth rectifier 118, respectively. First rectifier filter C1, second rectifier filter C2, third rectifier filter C3, and fourth rectifier filter C4 may be connected in series. Stated another way, the plurality of rectifier filters, or first rectifier filter C1, second rectifier filter C2, third rectifier filter C3, and fourth rectifier filter C4 in the exemplary embodiment of FIG. 1, may be connected in series. In this regard, a DC output voltage comprising the sum of the voltages of the first DC voltage, the second DC voltage, the third DC voltage, and the fourth DC voltage is passed to output filter 120. It should be appreciated that the DC output voltage (i.e., the voltage across positive terminal 142 and negative terminal 144) equals the sum of the voltages across each of the rectifier filters C1, C2, C3, and C4. So the voltage ratio, and thus the physical size, of the diodes in rectifiers 112, 114, 116, and 118 are reduced relative to the DC output voltage because said diodes only handle a portion of said voltage, and in this case approximately one fourth of said voltage. Similarly, the physical size of filters C1, C2, C3, and C4 are considerably reduced. Moreover, the size of the output filter 120 is considerably reduced because the voltage ripple is reduced. In various embodiments, filter C1 may comprise a capacitor. Filters C2, C3, and C4 may be similar to filter C1.

Output filter 120 may comprise inductor L1, inductor L2, inductor, L3, inductor L4, resistor R1, resistor R2, and capacitor C5. Inductor L1 may be connected in series with positive terminal 142 and connected in series with resistor R1 and inductor L2. Resistor R1 and inductor L2 may be connected in parallel. Inductor L3 may be connected in series with negative terminal 144 and connected in series with resistor R2 and inductor L4. Resistor R2 and inductor L4 may be connected in parallel. Capacitor C5 may be connected in series between inductor L2 and inductor L4. Output filter 120 may improve the quality of the DC output voltage.

A load 122 may receive the filtered DC output voltage. In various embodiments, load 122 may comprise a high voltage load. For example, load 122 may receive a DC output voltage of, for example, six hundred volts (600 V).

A voltage sensor 124 may be connected across load 122. Voltage regulator 126 may receive sensor signal 146 from voltage sensor 124 and may regulate the voltage across load 122 via external DC power supply 128, converter 150, and exciter field winding 130. In various embodiments, external DC power supply 128 may comprise a battery. In various embodiments, external DC power supply 128 may comprise a separate synchronous generator driven by the same prime mover 140. Converter 150 may comprise an asymmetric H-bridge topology. Exciter field winding 130 may be in electronic communication with main field winding 136. Voltage regulator may control converter 150 to vary the voltage supplied to exciter field winding 130 in response to sensor signal 146. In this regard, the exciter field winding 130 may control the DC output voltage of synchronous generator 110. Stated another way, the voltage regulator 126 may control the main field winding 136 via the exciter field winding 130.

Figure 2:
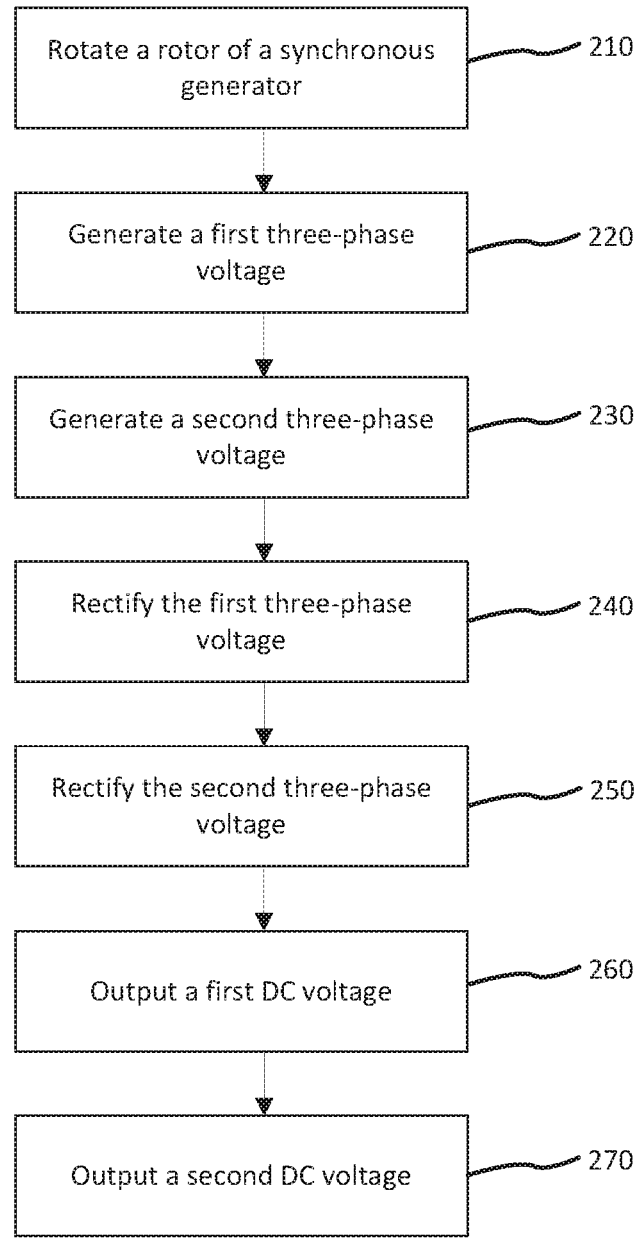
FIG. 2 illustrates a method for generating electric power, in accordance with various embodiments.
Figure 3:
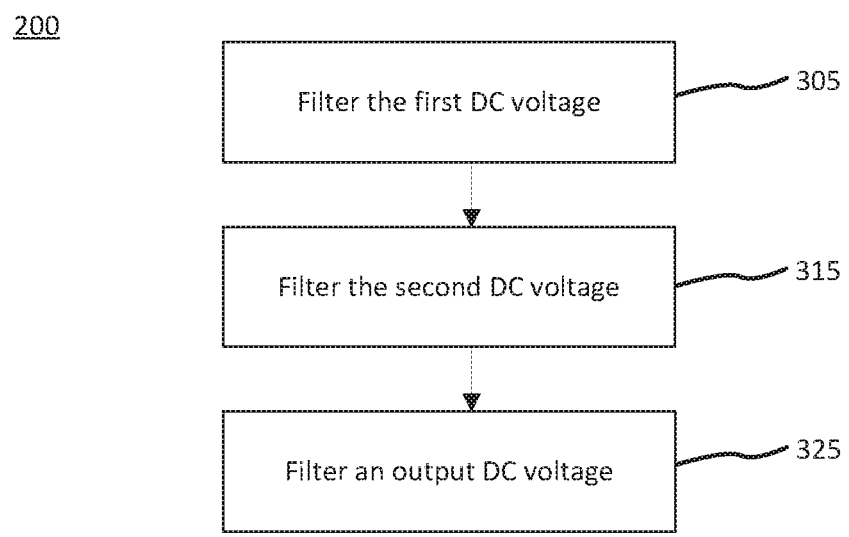
FIG. 3 illustrates further steps for the method for generating electric power of FIG. 2, in accordance with various embodiments.

With combined reference to FIG. 2 and FIG. 3, a method 200 for generating electric power is illustrated, in accordance with various embodiments. Method 200 includes rotating a rotor of a synchronous generator (step 210). Method 200 includes generating a first three-phase voltage (step 220). Method 200 includes generating a second three-phase voltage (step 230). Method 200 includes rectifying the first three-phase voltage (step 240). Method 200 includes rectifying the second three-phase voltage (step 250). Method 200 includes outputting the first DC voltage (step 260). Method 200 includes outputting the second DC voltage (step 270). Method 200 may further include filtering the first DC voltage (step 305). Method 200 may further include filtering the second DC voltage (step 315). Method 200 may further include filtering a DC output voltage (step 325).

With combined reference to FIG. 1 and FIG. 2, step 210 may include rotating rotor 160 of synchronous generator 110. Step 220 may include generating, via first armature winding 102, a first three-phase voltage in response to the rotation. Step 230 may include generating, via second armature winding 104, a second three-phase voltage in response to the rotation. Step 240 may include rectifying, via first rectifier 112, the first three-phase voltage into a first DC voltage. Step 250 may include rectifying, via second rectifier 114, the second three-phase voltage into a second DC voltage. Step 260 may include outputting, by synchronous generator 110, the first DC voltage. Step 270 may include outputting, by synchronous generator 110, the second DC voltage.

With combined reference to FIG. 1 and FIG. 3, step 305 may include filtering, by first rectifier filter C1, the first DC voltage. Step 315 may include filtering, by second rectifier filter C2, the second DC voltage, wherein first rectifier filter C1 and the second rectifier filter C2 are connected in series. Step 325 may include filtering, by output filter 120, a DC output voltage comprising the sum of the first DC voltage and the second DC voltage.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A synchronous generator comprising:
a rotor;
a stator comprising:
a first armature winding configured to output a first three-phase voltage; and
a second armature winding configured to output a second three-phase voltage;
a first rectifier housed within the synchronous generator and comprising a first output comprising a first positive terminal and a first negative terminal, the first output, the first positive terminal, and the first negative terminal are located externally from the synchronous generator, the first rectifier is configured to rectify the first three-phase voltage received from the first armature winding; and
a second rectifier housed within the synchronous generator and comprising a second output comprising a second positive terminal and a second negative terminal, the second output, the second positive terminal, and the second negative terminal are located externally from the synchronous generator, the second rectifier is configured to rectify the second three-phase voltage received from the second armature winding,
wherein the first output is configured to be connected in series with the second output.

2. The synchronous generator of claim 1, wherein the first rectifier is configured to output a first direct current (DC) voltage and the second rectifier is configured to output a second DC voltage.

3. The synchronous generator of claim 2, wherein the first rectifier comprises a first six-pulse rectifier and the second rectifier comprises a second six-pulse rectifier.

4. The synchronous generator of claim 2, wherein the rotor comprises an exciter armature winding, a rotating rectifier, and a main field winding.

5. The synchronous generator of claim 4, wherein the stator further comprises an exciter field winding configured to control an output voltage of the synchronous generator.

6. The synchronous generator of claim 2, wherein the synchronous generator comprises at least one of a permanent magnet generator (PMG) or a wound field synchronous generator.

7. An electric power generating system comprising,
a synchronous generator comprising:
a rotor;
a stator comprising:
a first armature winding configured to output a first three-phase voltage; and
a second armature winding configured to output a second three-phase voltage;
a first rectifier housed within the synchronous generator and comprising a first output comprising a first positive terminal and a first negative terminal, the first output, the first positive terminal, and the first negative terminal are located externally from the synchronous generator, the first rectifier is configured to rectify the first three-phase voltage received from the first armature winding; and
a second rectifier housed within the synchronous generator and comprising a second output comprising a second positive terminal and a second negative terminal, the second output, the second positive terminal, and the second negative terminal are located externally from the synchronous generator, the second rectifier is configured to rectify the second three-phase voltage received from the second armature winding, and the first output is connected in series with the second output;
a first rectifier filter connected across the first rectifier via the first output; and
a second rectifier filter connected across the second rectifier via the second output,
wherein the first rectifier filter and the second rectifier filter are connected in series.

8. The electric power generating system of claim 7, wherein the first rectifier is configured to output a first direct current (DC) voltage and the second rectifier is configured to output a second DC voltage.

9. The electric power generating system of claim 8, further comprising an output filter connected across the first rectifier filter and the second rectifier filter.

10. The electric power generating system of claim 9, wherein the output filter receives a DC output voltage comprising a sum of the first DC voltage and the second DC voltage.

11. The electric power generating system of claim 10, wherein the first rectifier comprises a first six-pulse rectifier and the second rectifier comprises a second six-pulse rectifier.

12. The electric power generating system of claim 10, wherein the rotor comprises an exciter armature winding, a rotating rectifier, and a main field winding.

13. The electric power generating system of claim 12, wherein the stator further comprises an exciter field winding.

14. The electric power generating system of claim 13, wherein the exciter field winding controls an output voltage of the synchronous generator.

15. The electric power generating system of claim 14, further comprising a voltage regulator in electronic communication with the output filter and in electronic communication with the exciter field winding, wherein the voltage regulator controls the main field winding via the exciter field winding.

16. The electric power generating system of claim 10, wherein the synchronous generator comprises at least one of a permanent magnet generator (PMG) or a wound field generator.

17. The electric power generating system of claim 7, wherein the first rectifier filter and the second rectifier filter are located externally from the synchronous generator.

18. A method for generating electric power comprising:
rotating a rotor of a synchronous generator;
generating, via a first stator armature winding, a first three-phase voltage in response to the rotating;
generating, via a second stator armature winding, a second three-phase voltage in response to the rotating;
rectifying, via a first rectifier, the first three-phase voltage into a first DC voltage, wherein the first rectifier is housed within the synchronous generator, the first rectifier comprises a first output comprising a first positive terminal and a first negative terminal, wherein the first output, the first positive terminal, and the first negative terminal are located externally from the synchronous generator;
rectifying, via a second rectifier, the second three-phase voltage into a second DC voltage, wherein the second rectifier is housed within the synchronous generator, the second rectifier comprises a second output comprising a second positive terminal and a second negative terminal, wherein the second output, the second positive terminal, and the second negative terminal are located externally from the synchronous generator, and the first output is connected in series with the second output;

outputting, by the synchronous generator, the first DC voltage; and outputting, by the synchronous generator, the second DC voltage.

19. The method of claim 18, further comprising:

filtering, by a first rectifier filter, the first DC voltage;

filtering, by a second rectifier filter, the second DC voltage, wherein the first rectifier filter and the second rectifier filter are connected in series; and filtering, by an output filter, a DC output voltage comprising a sum of the first DC voltage and the second DC voltage.

* * * * *